(12) United States Patent
Lehr et al.

(10) Patent No.: US 8,140,886 B2
(45) Date of Patent: Mar. 20, 2012

(54) APPARATUS, SYSTEM, AND METHOD FOR VIRTUAL STORAGE ACCESS METHOD VOLUME DATA SET RECOVERY

(75) Inventors: Douglas Lee Lehr, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 12/242,859

(22) Filed: Sep. 30, 2008

(65) Prior Publication Data

US 2010/0094811 A1   Apr. 15, 2010

(51) Int. Cl.
*G06F 11/00* (2006.01)
(52) U.S. Cl. .............................................. 714/2; 714/15
(58) Field of Classification Search .................. None
See application file for complete search history.

(56) References Cited

U.S. PATENT DOCUMENTS

| 7,158,999 B2 | 1/2007 | Pace et al. |
| 2008/0109599 A1 * | 5/2008 | Smith ........................... 711/112 |

* cited by examiner

*Primary Examiner* — Michael Maskulinski
(74) *Attorney, Agent, or Firm* — Kunzler Needham Massey & Thorpe

(57) ABSTRACT

An apparatus, system, and method are disclosed for Virtual Storage Access (VSAM) Volume Data Set (VVDS) recovery. A store module stores a data set name and data set characteristics for a data set in a recovery table when the data set is defined under a Z/OS® operating system. The recovery table indexed by the data set name. A retrieve module retrieves a Z/OS® Volume Table of Contents (VTOC) entry indexed by the data set name. In addition, the retrieve module retrieves the data set characteristics from the recovery table using the data set name. A recover module combines the data set characteristics and the VTOC entry to recover a Z/OS® VVDS entry.

20 Claims, 6 Drawing Sheets

APPARATUS, SYSTEM, AND METHOD FOR VIRTUAL STORAGE ACCESS METHOD VOLUME DATA SET RECOVERY

BACKGROUND OF THE INVENTION

1. Field of the Invention

This invention relates to catalog recovery and more particularly relates to recovering Virtual Storage Access Method (VSAM) Volume Data Set (VVDS) data.

2. Description of the Related Art

The Z/OS® operating system from International Business Machines Corporation (IBM) of Armonk, N.Y. uses VVDS data to open and process System Managed Storage (SMS) and VSAM data sets. In the past, if a VVDS is corrupted, an entire volume storing the VVDS must be recovered, resulting in a substantial delay to recovering the VVDS data.

SUMMARY OF THE INVENTION

From the foregoing discussion, there is a need for an apparatus, system, and method that recovers VVDS entries. Beneficially, such an apparatus, system, and method would speed the recovery of VSAM volume data sets.

The present invention has been developed in response to the present state of the art, and in particular, in response to the problems and needs in the art that have not yet been fully solved by currently available VVDS recovery methods. Accordingly, the present invention has been developed to provide an apparatus, system, and method for VSAM volume data set recovery that overcome many or all of the above-discussed shortcomings in the art.

A store module stores a data set name and data set characteristics for a data set in a recovery table when the data set is defined under a Z/OS® operating system. The recovery table indexed by the data set name.

A retrieve module that retrieves a Z/OS® Volume Table of Contents (VTOC) entry indexed by the data set name. In addition, the retrieve module retrieves the data set characteristics from the recovery table using the data set name. A recover module combines the data set characteristics and the VTOC entry to recover a Z/OS® VVDS entry.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention stores a data set name in data set characteristics for a data set in a recovery table. In addition, the present invention may recover and combine VTOC entries and entries from the recovery table to recover a VVDS. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
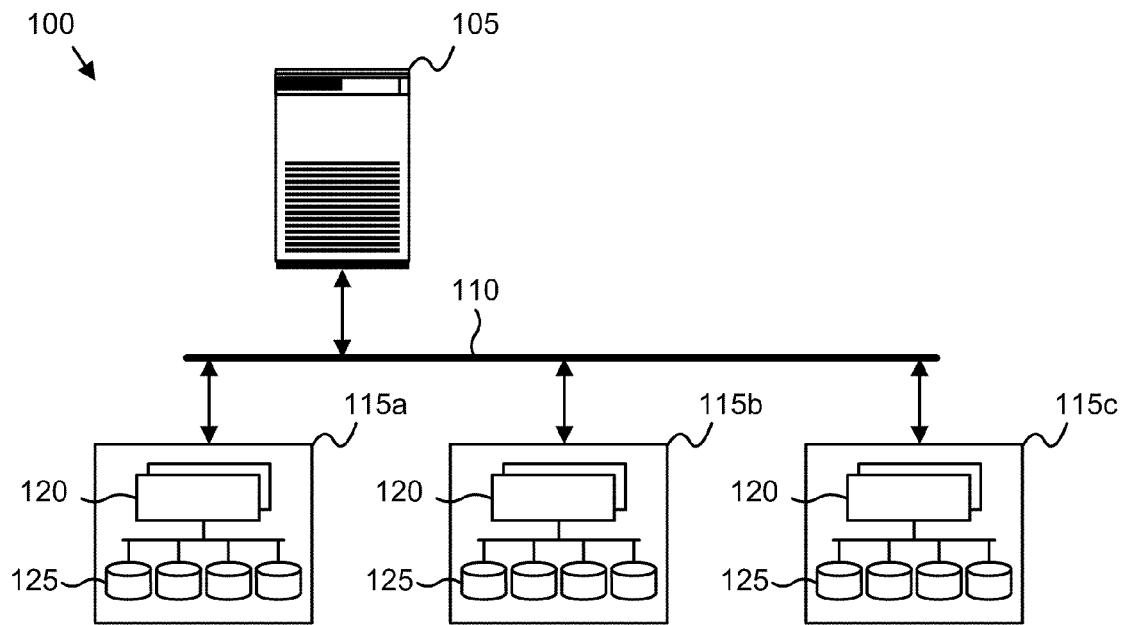
FIG. 1 is a schematic block diagram illustrating one embodiment of a data storage system in accordance with the present invention.

FIG. 1 is a schematic block diagram illustrating one embodiment of a data storage system 100 in accordance with the present invention. The system 100 includes a computer 105, a network 110, and one or more storage subsystems 115. Each storage subsystem 115 may include one or more storage controllers 120 and one or more storage devices 125.

The storage devices 125 may be hard disk drives, optical storage devices, magnetic tape drives, micromechanical storage devices, holographic storage devices, and semiconductor storage devices. Alternatively, the storage device 125 may also be configured as a just a bunch of disks (JBOD), a redundant array of independent disks (RAID), a tape library, a tape backup, a tape library, a compact disk read only memory (CD ROM) library, and the like.

In one embodiment, the system 100 provides data storage and data manipulation services for the clients or hosts. For example, a client may access data stored on a storage device 125 of a storage subsystem 115 by communicating a request through the network 110 to a storage controller 120 for the storage device 125. The storage controller 120 may retrieve the data from the storage device 125 and communicate the data to the client.

The network 110 may be selected from a local area network (LAN), a wide area network (WAN), the Internet, an Ethernet network, a token ring network, or the like. The network 110 may comprise one or more nodes that may provide one or more physical and/or logical paths for transferring the data.

The computer 105 may manage the system 100. The computer 105 operates under the Z/OS® operating system. The storage devices 125 may be organized as one or more logical volumes using a Z/OS® Internal Catalog Facility (ICF) as will be described hereafter. The computer 105 may store data sets to the storage devices 125 using the ICF.

Figure 2:
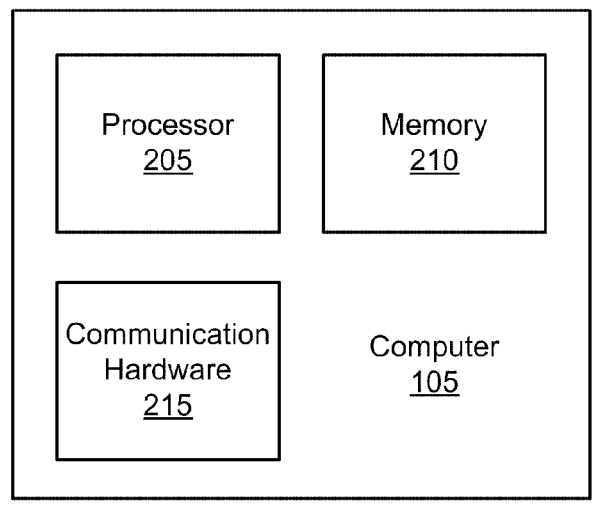
FIG. 2 is a schematic block diagram illustrating one embodiment of computer of the present invention.

FIG. 2 is a schematic block diagram illustrating one embodiment of computer 105 of the present invention. The computer 105 may be the computer 105 of FIG. 1. The description of the computer 105 refers to elements of FIG. 1, like numbers referring to like elements. The computer includes a processor 205, a memory 210, and communication hardware 215.

The memory 210 stores a computer readable program. The computer readable program may include executable code and data. The memory 210 may be a semiconductor device such as a Dynamic Random Access Memory (DRAM). Alternatively, the memory 210 may be flash memory, a micromechanical memory, and optical memory, holographic memory, a hard disk drive, or the like. One of skill in the art will recognize that the memory 210 may be any type of tangible storage device.

The processor 205 retrieves the computer readable program from the memory 210. In addition, the processor 205 processes the computer readable program as is well known to those of skill in the art.

The communication hardware 215 communicates with external devices. For example, the computer 105 may communicate with the network 110 through the communication hardware 215. The communication hardware 215 may comprise an Ethernet interface, a Fibre Channel interface, or the like.

Figure 3:
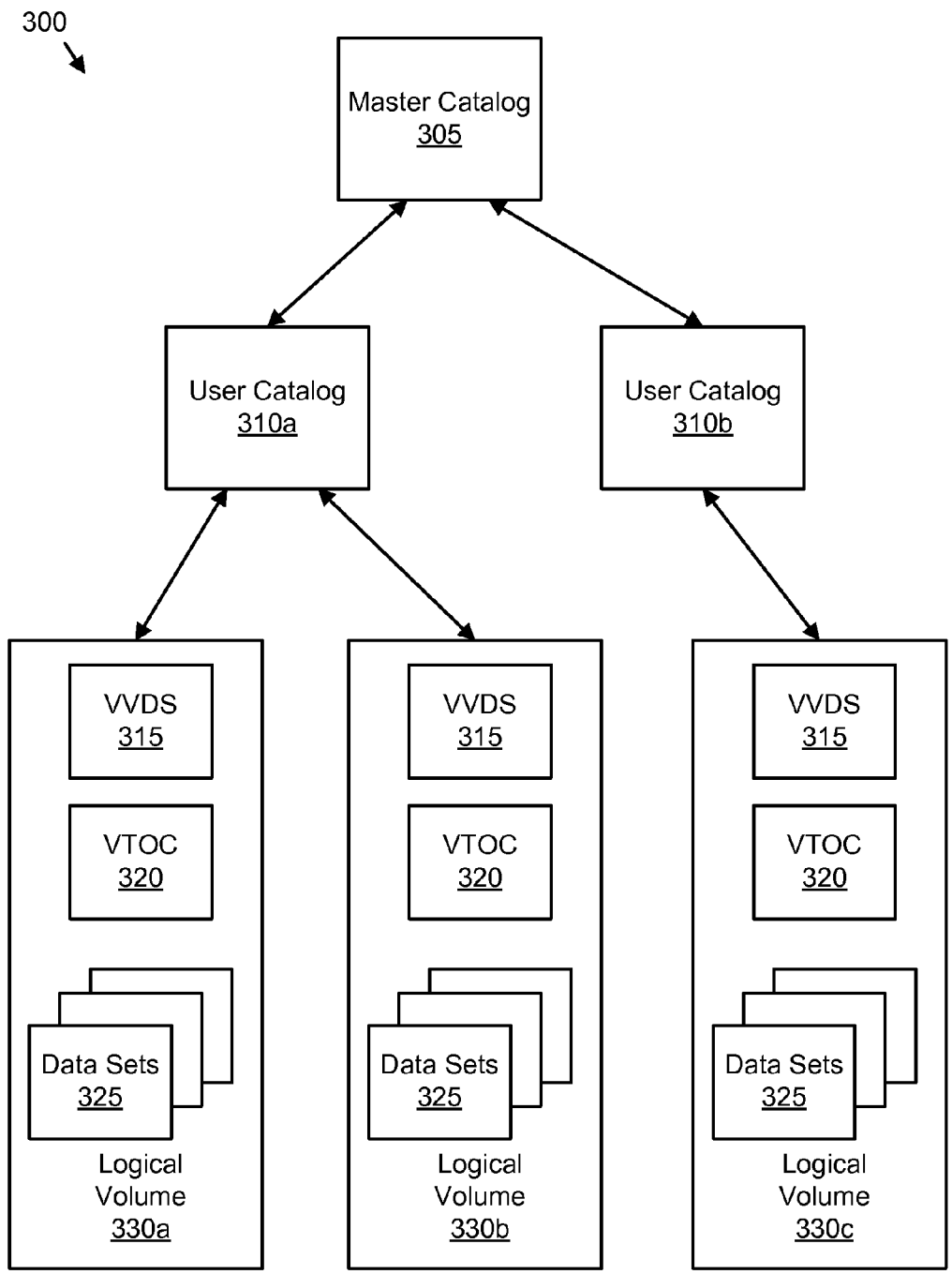
FIG. 3 is a schematic block diagram illustrating one embodiment of a Z/OS® Internal Catalog Facility (ICF) of the present invention.

FIG. 3 is a schematic block diagram illustrating one embodiment of a Z/OS® ICF 300 of the present invention. The description of the ICF 300 refers to elements of FIGS. 1-2, like numbers referring to like elements. The ICF 300 may comprise a computer readable program stored on the memory 210 and executed by the processor 205. In addition, the ICF 300 may comprise one or more data structures stored on the storage devices 125 and/or in the memory 210.

The ICF 300 supports the locating of a data set, file, data structure, and the like, referred to herein as data set, without knowledge of the directory structures or paths of the ICF 300. A data set may be accessed using only a data set name. Under ICF 300, each data set name is unique. In one embodiment, each data set name comprises 1-8 character qualifiers separated by periods. One example of a data set name is 'customer.job.library.'

The ICF 300 includes a master catalog 305, one or more user catalogs 310, and one or more logical volumes 330. The master catalog 305 contains system data set location entries and data set entries for Initial Program Load (IPL). In addition, the master catalog 305 references the user catalogs 310 using aliases that are related to a user catalog 310. The user catalogs 310 associate data sets 325 with logical volumes 330.

Each logical volume 330 may comprise portions of one or more storage devices 125. In addition, each logical volume 330 stores one or more data sets 325. Each data set 325 is stored and maintained using ICF protocols including SMS and VSAM. Each logical volume 330 further includes a VVDS 315 and a VTOC 320. The VTOC 320 stores information about where each data set 325 physically resides. For example, the VTOC 320 may record the physical address, record length, and block size of a data set 325 stored on the storage devices 125. The user catalog 310 references the VTOC 320 to determine the physical location of the data set in the logical volume 330.

The VVDS 315 stores additional information that is used to open and process the data sets 325 as will be described hereafter. For example, the VVDS 315 may store a data set size.

If a VVDS 315 becomes corrupted, the ICF 300 may be unable to open and process data sets 325. In the past, it has been necessary to rebuild a logical volume 330 to recover the logical volume's VVDS 315. The present invention recovers the VVDS 315 as will be described hereafter.

Figure 4:
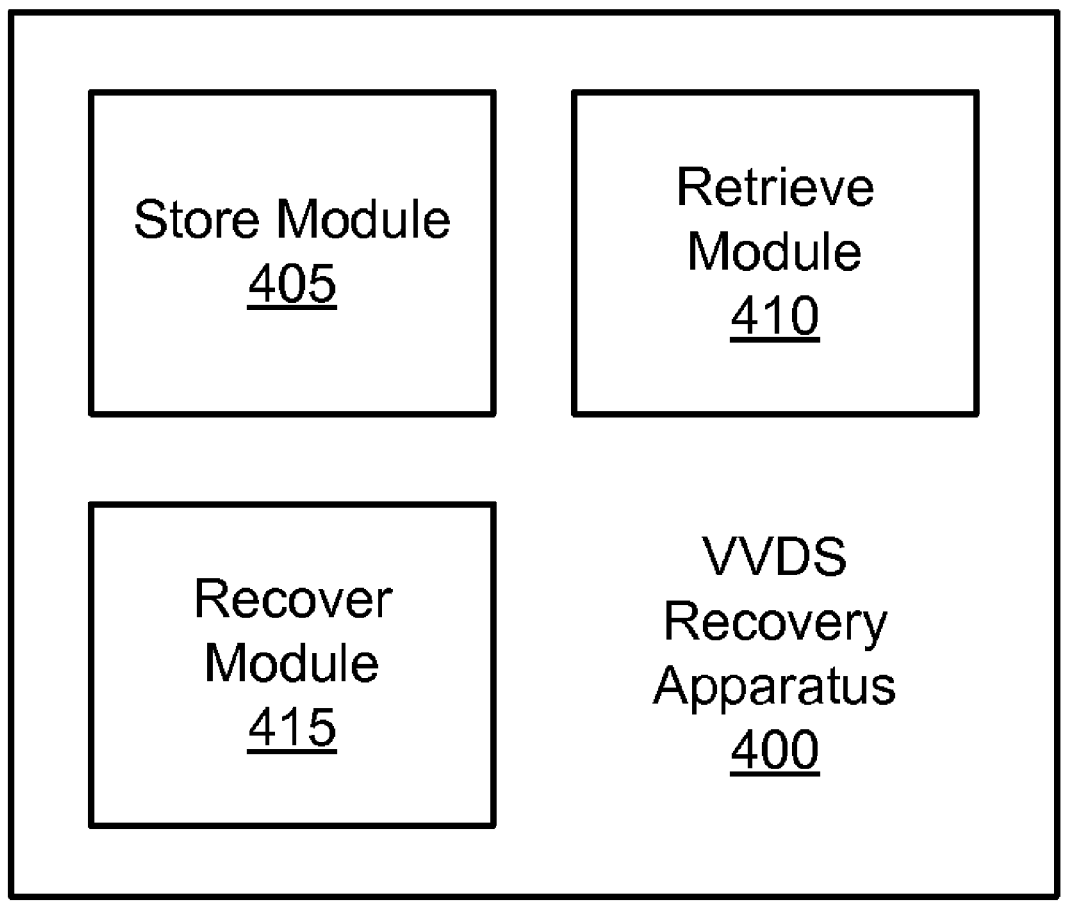
FIG. 4 is a schematic block diagram illustrating one embodiment of a VVDS recovery apparatus of the present invention.

FIG. 4 is a schematic block diagram illustrating one embodiment of a VVDS recovery apparatus 400 of the present invention. The apparatus 400 may be embodied in the computer 105 of FIGS. 1 and 2. In addition, the apparatus 400 may be embodied in the ICF 300 of FIG. 3. The apparatus 400 includes a store module 405, a retrieve module 410, and the recover module 415. The description of the apparatus 400 refers to elements of FIGS. 1-3, like numbers referring to like elements.

The store module 405, the retrieve module 410, and the recover module 415 may be embodied in a computer program product comprising a computer useable medium. The computer usable medium includes a computer readable program stored on a tangible storage device. The tangible storage device may be the memory 210 and/or a storage device 125. The computer readable program may be executed by the processor 205 of the computer 105.

The store module 405 stores a data set name and data set characteristics for a data set 325 in a recovery table. In one embodiment, the store module 405 stores the data set name and the data set characteristics when the data set 325 is defined under the Z/OS® operating system. For example, a Job Control Language (JCL) command may create a data set. The JCL command may specify the data set name and one or more data set characteristics. The ICF 300 may specify additional data set characteristics. The recovery table may be indexed by the data set name.

The retrieve module 410 retrieves a Z/OS® VTOC entry indexed by the data set name. In one embodiment, the retrieve module 410 retrieves the Z/OS® the VTOC entry when there is a need to recover the VVDS 315. The retrieve module 410 retrieves the VTOC entry from the VTOC 320.

In addition, the retrieve module 410 retrieves the data set characteristics from the recovery table using the data set name. The recover module 415 combines the data set characteristics and the VTOC entry to recover a Z/OS® VVDS entry. In one embodiment, the recover module 415 combines the data set characteristics for a plurality of data sets 325 with the VTOC entries for the plurality of data sets 325 to recover the VVDS 315.

Figure 5:
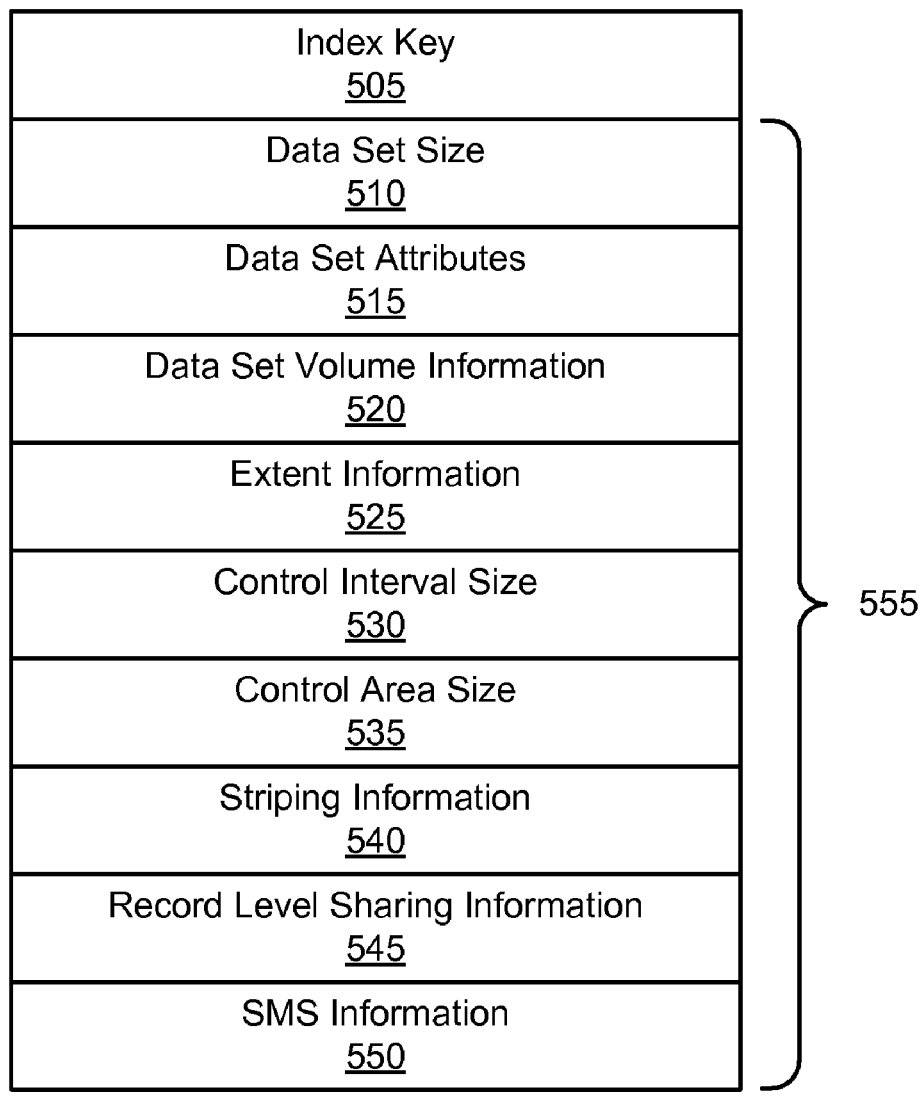
FIG. 5 is a schematic block diagram illustrating one embodiment of a recovery table entry of the present invention.

FIG. 5 is a schematic block diagram illustrating one embodiment of a recovery table entry 500 of the present invention. The store module 405 of FIG. 4 may create the recovery table 500 by storing data set names and data set characteristics 555 for each data set 325 that is defined under the ICF 300. The description of the recovery table 500 refers to elements of FIG. 1-4, like numbers referring to like elements. The recovery table 500 includes an index key 505, a data set size 510, data set attributes 515, data set volume information 520, extent information 525, a control interval (CI) size 530, a controlled areas (CA) size 535, striping information 540, record levels sharing information 545, and SMS information 550.

The index key 505 is used to reference the recovery table entry 500. The data set name may be employed as the index key 505. In an alternate embodiment, the index key 505 may comprise the data set name concatenated with a date such as a time stamp. The recovery table entry 500 for a given data set 325 may be retrieved using the index key 505.

In one embodiment, the data set size 510, data set attributes 515, data set volume information 520, extent information 525, CI size 530, CA size 535, striping information 540, record levels sharing information 545, and SMS information 550 comprise the data set characteristics 555. One of skill the art will recognize that the data set characteristics 555 may include other information.

The data set size 510 may specify the size of the data set 325. For example, the data set 325 may have a size of 40 MB. The data set size 510 may be used in determining an amount of space to the allocated for receiving the data set 325. For example, if the data set 325 is to be copied from a logical volume 330 to memory 210, the data set size 510 may be used to allocate space in the memory 210.

The data set attributes 515 may specify additional attributes of the data set 325. For example, the data set attributes 515 may specify if the data set 325 is read-only data set 325, or if the data set 325 may be overwritten and/or modified. In addition, the data set attributes 515 may specify a data set owner. In one embodiment, the data set attributes 515 specify a date the data set 325 was created, a day to the data set 325 was last modified, and the like.

The data set volume information 520 may describe the logical volume 330 which stores the data set 325. The data set volume information 520 may include the name of the logical volume 330, the name of a user catalog 310, and the like.

The extent information 525 describes the extents, contiguous areas of storage, used to store the data set 325. For example, each data set 325 may be stored on a plurality of extents. The extent information 525 may describe the extents used to store the data set 325.

The CI size 530 is the size of the control interval of a VSAM data sets. The CI size 530 specifies the record size that must be blocked and deblocked by an application program. In this one embodiment, the CI size 530 is the range of 512 bytes to 32 KB for most VSAM data set types. For example, the CI size 530 may be 4 KB. The CA size 535 specifies the control area. A CA is formed by two or more CIs put together into a fixed-length contiguous area of direct access storage. The minimum CA size 535 is 1 track, and the maximum CA size 535 is one cylinder. For example the CA size 535 may specify 4 tracks. The CI size 530 and the CA size 535 together describe a configuration of data in a data set 325.

The striping information 540 may specify the striping of extents across multiple storage devices 125. For example, a data set 325 may be divided into 128 extents. The extents may be striped across four storage devices 125, with 32 extents written to each storage device 125. The striping information 540 may also describe the location of redundant data for the data set 325. For example, parody data for a data set 325 with three extents may be written on a fourth extent. In a certain embodiment, the striping information 540 specifies data redundancy for the data set 325.

The record level sharing information 545 may specify the computers 105 and/or systems that may access a data set 325. For example, a data set 325 may be shared by multiple transaction server computers 105 that operate under the Z/OS® operating system. The record level sharing information 545 may identify the transaction server computers 105 that may access the data set 325. In addition, the record level sharing information may specify which transaction server computer 105 may write to the data set 325.

The SMS information 550 may specify a storage class, a data class, and a management class for the data set 325. The storage class, data class, and management class may be SMS classes. The storage class may specify guaranteed space, latency, and other requirements for the data set 325. In one embodiment, the data class specifies redundancy, format, addressability, and the like for the data set 325. The management class may define a frequency of backups, migration requirements, and the like for the data set 325.

Figure 6:
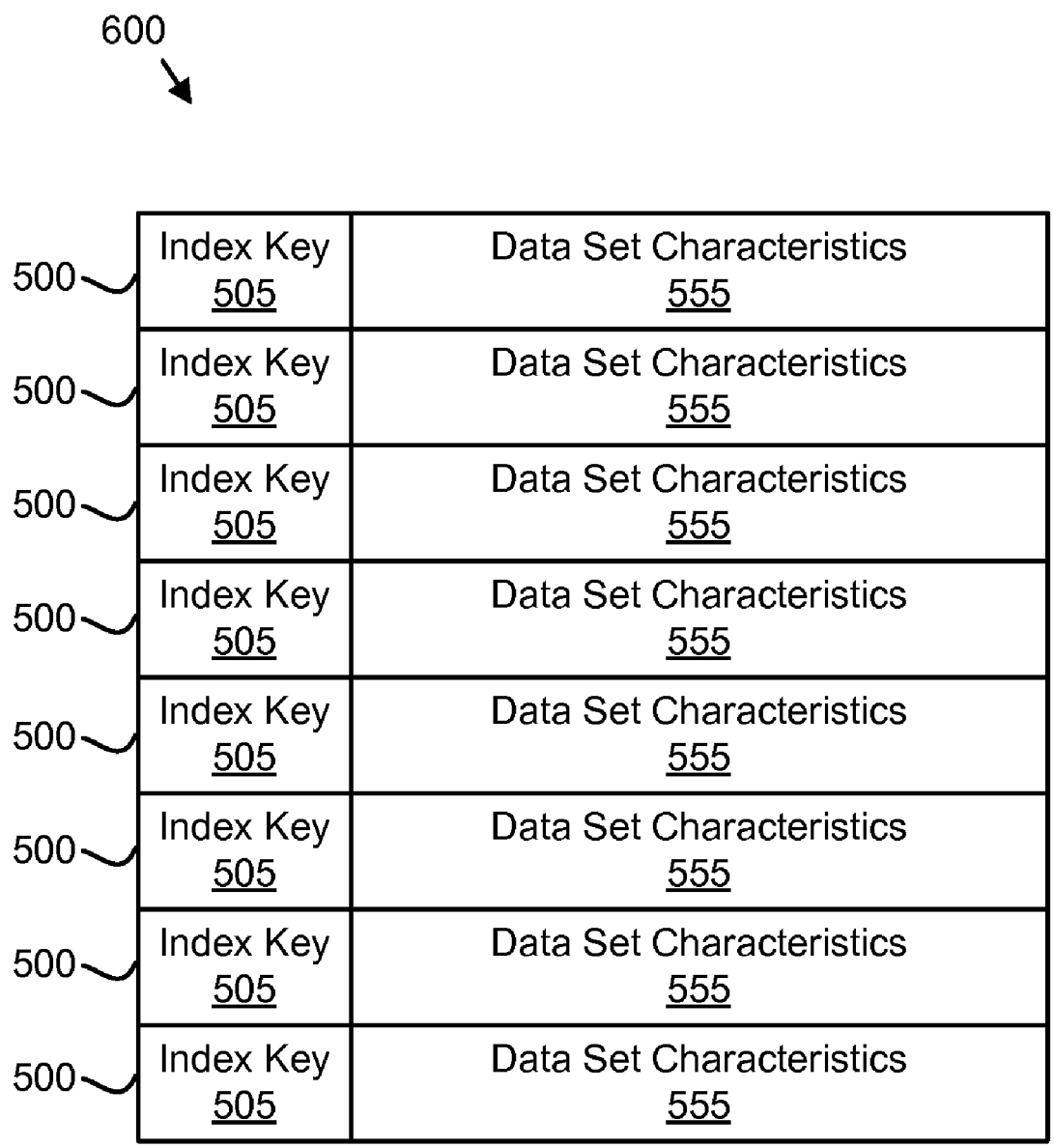
FIG. 6 is a schematic block diagram illustrating one embodiment of a recovery table of the present invention.

FIG. 6 is a schematic block diagram illustrating one embodiment of a recovery table 600 of the present invention. The description of the recovery table 600 refers to elements of FIGS. 1-5, like numbers referring to like elements. The recovery table 600 comprises a plurality of recovery table entries 500. Each recovery table entry 500 is indexed by an index key 505 to access data set characteristics 555.

In one embodiment, when a data set 325 is defined, the store module 405 stores the data set name as the index key 505 and data set characteristics 555 for the data set 325 in the recovery table 600 as the recovery table entry 500 for the data set 325. The recover table entry 500 for the data set 325 may persist if the data set 325 is deleted. In addition, the recovery table entry 500 for a deleted data set 325 may be used to redefine the data set 325 if the data set 325 is re-created. Thus the recovery table 600 may be used to define a data set 325 without a JCL command.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
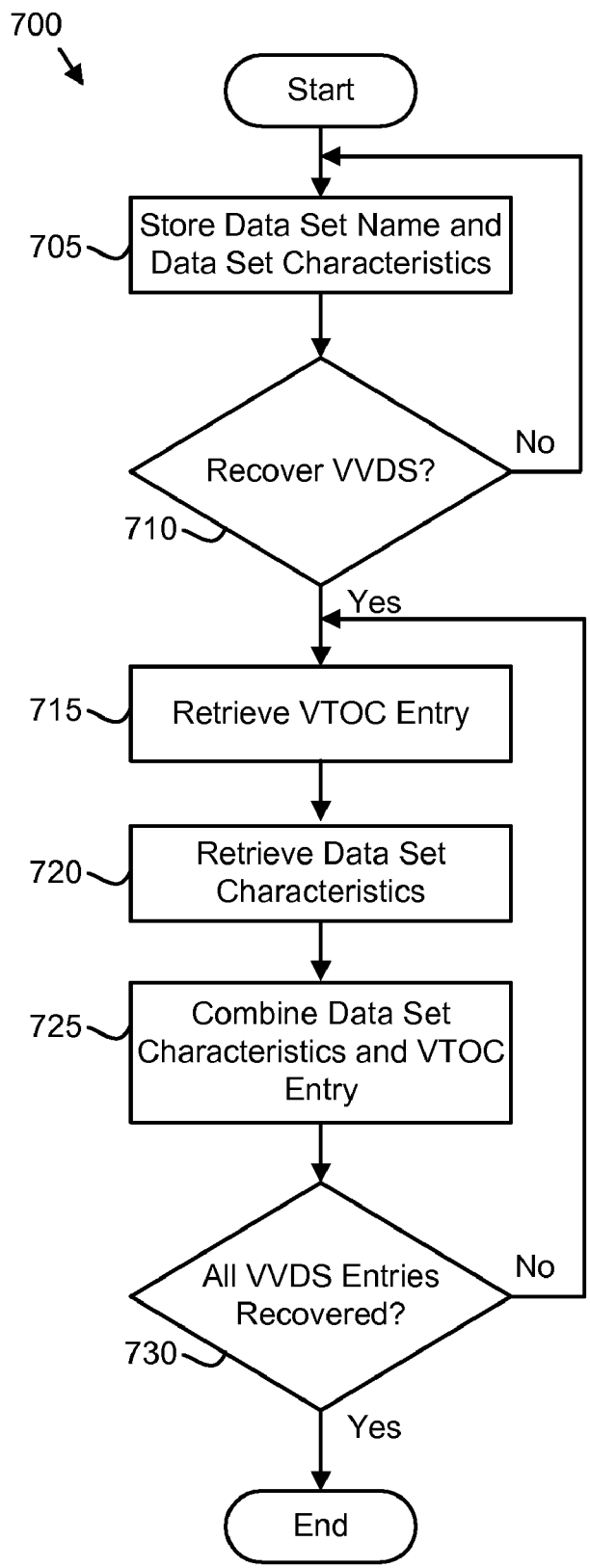
FIG. 7 is a schematic flow chart diagram illustrating one embodiment of a VVDS recovery method of the present invention.

FIG. 7 is a schematic flow chart diagram illustrating one embodiment of a VVDS recovery method 700 of the present invention. The method 700 substantially includes the steps to carry out the functions presented above with respect to the operation of the described apparatus and system of FIGS. 1-6. In one embodiment, the method 700 is implemented with a computer program product comprising a computer readable medium having a computer readable program. The computer readable program may be integrated into a computing system, such as the computer 105, wherein the program in combination with the computing system is capable of performing the method 700.

The method 700 begins, and the store module 405 stores 705 a data set name as an index key 505 and data set characteristics 555 for a data set 325 as a recovery table entry 500 in a recovery table 600. In one embodiment, the store module 405 stores 705 the data set name and the data set characteristics 555 when the data set 325 is defined by a JCL command. In an alternate embodiment, the data set 325 may be redefined using an existing recovery table entry 500 for the data set 325. The recover table entry 500 for the data set 325 persists after the redefinition of the data set 325.

The recover module 415 may determine 710 whether to recover the VVDS 315 and/or a VVDS entry. In one embodiment, the recover module 415 determines 710 to recover the VVDS 315 in response to command from an administrator. In an alternate embodiment, the recover module 415 may be directed to recover the VVDS 315 by one or more elements of the ICF 300. For example, the ICF 300 may detect corruption of the VVDS 315. The ICF 300 may direct the recover module 415 to initiate recovery of the VVDS 315.

If the recover module 415 determines 710 not to recover the VVDS 315, the store module 405 continues to store a data set name and data set characteristics 555 for each data set 325 that is defined. If the recover module 415 determines 710 to recover the VVDS 315, the retrieve module 410 retrieves 715 a VTOC entry indexed by the data set name from the VTOC 320.

In addition, the retrieve module 410 retrieves 720 the data set characteristics 555 from the recovery table entry 500 of the recovery table 600 for the data set 325 using the data set name as an index. In an alternate embodiment, the retrieve module 410 retrieves 720 the data set characteristics 555 using the data set name concatenated with the date as an index.

The recover module 415 combines 725 the data set characteristics 555 and the VTOC entry retrieved 715 from the VTOC 320 to recover a VVDS entry. In one embodiment, the recover module 415 creates a data structure in the memory 210. The data structure may include a one or more fields, words, and the like that correspond to fields and/or words of a VVDS entry. The recover module 415 may copy the index key 505 to a data set name field in the data structure. Similarly, the recover module 415 may copy the data set size 510, data set attributes 515, data set volume information 520, extent information 525, CI size 530, CA size 535, striping information 540, record levels sharing information 545, and SMS information 550 from the recovery table entry 500 to the data structure.

The recover module 415 may also copy the data from the VTOC entry to the data structure. In one embodiment, the recover module 415 may compare data fields of the VTOC entry and a recovery table entry 500 to validate that the VTOC entry and recovery table entry 500 are associated with the same data set 325.

In one embodiment, the recover module 415 copies the data structure to a logical volume 330 to complete the combination of the data set characteristics 555 and the VTOC entry, and the recovery of the VVDS entry. Alternatively, the recover module 415 may designate the data structure as the VVDS entry.

In one embodiment, the recover module 415 calculates data values for storage in the data structure. The calculated data values may be needed if the data set characteristics 555 and/or VTOC entry are missing information. For example, the recover module 415 may calculate a data set size 510 using the extent information 525, the CI size 530, and the CA size 535.

The recover module 415 determines 725 if all VVDS entries for the VVDS 315 are recovered. In one embodiment, the recover module 415 counts a number of entries in the VTOC 320 and recovers that number of entries for the VVDS 315. Alternatively, the recover module 415 may recover a VVDS entry for each recovery table entry 500 in the recovery table 600. In a certain embodiment, the recover module 415 steps sequentially through each VTOC entry in the VTOC 320 and recovers the corresponding VVDS entry. The recover module 415 may also step sequentially through each recovery table entry 500 in the recovery table 600 and recover the corresponding VVDS entry.

If the recover module 415 determines 725 that all VVDS entries are not recovered, the retrieve module 410 may retrieve 715 a next VTOC entry from the VTOC 320. If the recover module 415 determines 725 that all VVDS entries are recovered, the method 700 ends.

The present invention stores a data set name in data set characteristics 555 for a data set 325 in recovery table 600. The recovery table is used along with the VTOC 320 to recover the VVDS 315 if the VVDS 315 becomes corrupted and/or unavailable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program stored on a tangible storage device, wherein the computer readable program when executed on a computer causes the computer to:

store a data set name and data set characteristics for a data set in a recovery table when the data set is defined under a Z/OS® operating system, the recovery table indexed by the data set name;

retrieve a Z/OS® Volume Table of Contents (VTOC) entry indexed by the data set name;

retrieve the data set characteristics from the recovery table using the data set name; and combine the data set characteristics and the VTOC entry to recover a Z/OS® Virtual Storage Access Method (VSAM) Volume Data Set (VVDS) entry.

2. The computer program product of claim 1, wherein the data characteristics comprise a data set size, data set attributes, and data set volume information.

3. The computer program product of claim 2, wherein the data characteristics further comprise extent information.

4. The computer program product of claim 1, wherein the data characteristics further comprise a Control Interval (CI) size and a Control Area (CA) size.

5. The computer program product of claim 1, wherein the data characteristics further comprise striping information and record level sharing information.

6. The computer program product of claim 1, wherein the data characteristics further comprise Z/OS® System Managed Storage (SMS) information.

7. The computer program product of claim 1, wherein the computer readable program is further configured to cause the computer to redefine the data set using the data characteristics of the recovery table.

8. The computer program product of claim 1, wherein the recovery table is indexed with the data set name concatenated with a date.

9. An apparatus for VVDS recovery, the apparatus comprising:
a store module that stores a data set name and data set characteristics for a data set in a recovery table when the data set is defined under a Z/OS® operating system, the recovery table indexed by the data set name;
a retrieve module that retrieves a Z/OS® VTOC entry indexed by the data set name, and retrieves the data set characteristics from the recovery table using the data set name; and
a recover module that combines the data set characteristics and the VTOC entry to recover a Z/OS® VVDS entry.

10. The apparatus of claim 9, wherein the data characteristics comprise a data set size, data set attributes, and data set volume information.

11. The apparatus of claim 9, wherein the data characteristics further comprise extent information.

12. The apparatus of claim 9, wherein the data characteristics further comprise a CI size and a CA size.

13. The apparatus of claim 9, wherein the data characteristics further comprise striping information and record level sharing information.

14. The apparatus of claim 9, wherein the data characteristics further comprise Z/OS® SMS information.

15. The apparatus of claim 9, wherein the recover module also redefines the data set using the data characteristics of the recovery table.

16. The apparatus of claim 9, wherein the recovery table is indexed with the data set name concatenated with a date.

17. A system for VVDS recovery, the system comprising:
a plurality of storage devices organized as at least one logical volume using an Internal Catalog Facility (ICF) of a Z/OS® operating system;
a computer with a memory that stores executable code and data and a processor that processes the executable code and data, the executable code and data comprising
a store module that stores a data set name and data set characteristics for a data set of the at least one logical volume in a recovery table when the data set is defined, the recovery table indexed by the data set name concatenated with a date;
a retrieve module that retrieves a Z/OS® VTOC entry indexed by the data set name, and retrieves the data set characteristics from the recovery table using the data set name; and
a recover module that combines the data set characteristics and the VTOC entry to recover a Z/OS® VVDS entry.

18. The system of claim 17, wherein the data characteristics comprise a data set size, data set attributes, data set volume information, extent information, a CI size, a CA size, striping information, record level sharing information, and Z/OS® SMS information.

19. The system of claim 17, wherein the recover module also redefines the data set using the data characteristics of the recovery table.

20. A method for deploying computer infrastructure, comprising integrating a computer readable program stored on a tangible storage device into a computing system, wherein the program in combination with the computing system is capable of performing the following:
store a data set name and data set characteristics for a data set in a recovery table when the data set is defined under a Z/OS® operating system, the recovery table indexed by the data set name concatenated with a date, the data characteristics comprising a data set size, data set attributes, data set volume information, extent information, a CI size, a CA size, striping information, record level sharing information, and Z/OS® SMS information;
retrieve a Z/OS® VTOC entry indexed by the data set name;
retrieve the data set characteristics from the recovery table using the data set name; and
combine the data set characteristics and the VTOC entry to recover a Z/OS®VVDS entry.

* * * * *